No. 831,157. PATENTED SEPT. 18, 1906.
D. A. HELLUMS.
CULTIVATOR.
APPLICATION FILED NOV. 11, 1905.
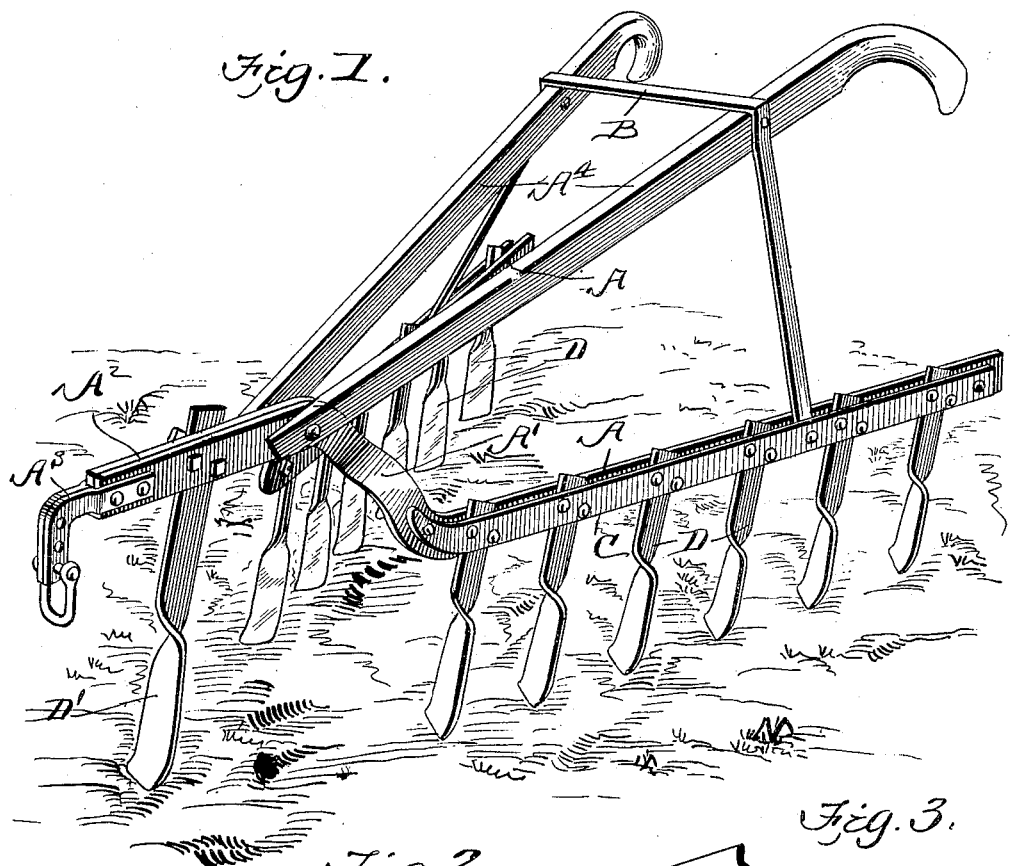
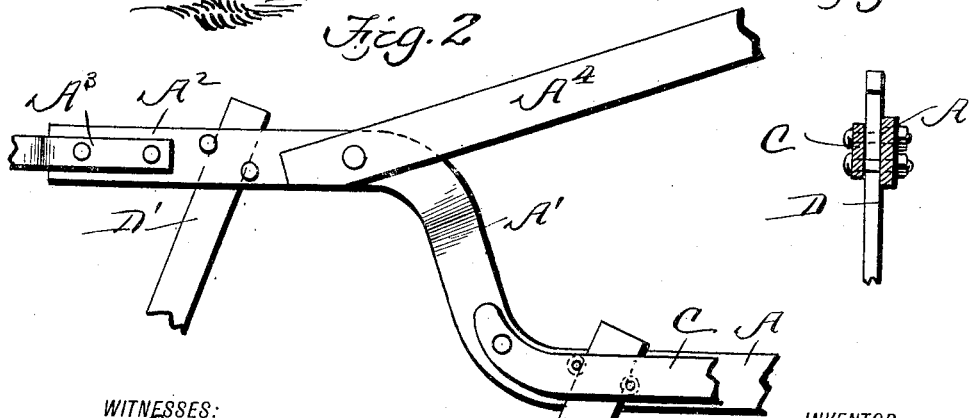
WITNESSES:
INVENTOR
D. A. Hellums.
BY
O'Meara & Brock
ATTORNEYS

UNITED STATES PATENT OFFICE.

DAVID A. HELLUMS, OF ROBBS, MISSISSIPPI.

CULTIVATOR.

No. 831,157.

Specification of Letters Patent.

Patented Sept. 18, 1906.

Application filed November 11, 1905. Serial No. 286,858.

*To all whom it may concern:*

Be it known that I, DAVID A. HELLUMS, a citizen of the United States, residing at Robbs, in the county of Pontotoc and State of Mississippi, have invented a new and Improved Cultivator, of which the following is a specification.

This invention relates to a cultivator adapted for corn, cotton, and other similar crops.

The invention consists of the novel features of construction, combination, and arrangement of parts hereinafter described, and pointed out in the claims and shown in the accompanying drawings, in which—

Figure 1 is a perspective view of the cultivator. Fig. 2 is a vertical side elevation of a front portion of the frame. Fig. 3 is a vertical transverse section through one of the side members of the frame. Fig. 4 is a plan view of a portion of one side of the frame, a cultivator-tooth being shown in section.

In constructing my cultivator I employ a triangular frame consisting of forwardly-converging side members A. Adjacent the apex of the frame the side members are curved inwardly, as shown at A', and then extended forwardly parallel to and in contact with each other, as shown at $A^2$.

A clevis $A^3$ is carried at the front end of the frame and serves to bind the front ends of the side members together. Upon the rear portion of each of the side members A is secured an outer face-plate C, and between the face-plate C and the side members A are bolted the free end portions of a U-shaped frame B, the bow portion of which embraces and supports the rear portions of suitable handles $A^4$, which at their lower ends are connected to the apex of the frame. The face-plates C are held to the side members A by means of a plurality of bolts arranged in pairs, one bolt of each pair being in a lower plane than the other bolt, and between these bolts and also between the face-plates C and side members A are held a plurality of cultivator-teeth D, the shank portion of the teeth resting between the bolts of each pair and projecting downwardly and forwardly. The shanks are then twisted upon themselves to provide cultivator-teeth. In advance of the handles $A^4$ a cultivator-tooth D', constructed substantially the same as the teeth D, but of greater length, is secured to one of the side members $A^7$.

Having thus fully described my invention, what I claim as new, and desire to secure by Letters Patent, is—

1. A cultivator of the kind described comprising a triangular-shaped frame, face-plates connected to the forward end of said frame and spaced from the side members of the frame, and cultivator-teeth twisted upon themselves and having their shank portions held between the face-plates and the side members of the frame, and a handle connected to the forward portion of the frame and supported by a frame secured between the side members and the face-plates.

2. A cultivator comprising a triangular-shaped frame having a front portion in a higher plane than the rear portion, plates carried upon the outer face of the rear portion of the side members of the frame, bolts arranged in pairs passing through the face-plates and through the side members of the frame, cultivator-teeth having shank portions held between said face-plates and side members, and between the bolts of each pair, handles connected to the apex portion of the frame, and a cultivator-tooth carried by one of the frame members adjacent its forward end in advance of the said handles.

3. A cultivator having a frame comprising converging side members curved inwardly and upwardly adjacent their front ends and extending forwardly parallel to and in contact with each other, handles connected to the upper front portion of the frame, a U-shaped yoke carried by the frame and having its bow portion embracing the rear portions of the handles plates arranged upon the outer sides of the sides of the frame and spaced therefrom, and means for detachably holding the plurality of cultivator-teeth between the said plates and the side members of the frame.

4. A cultivator comprising a triangular-shaped frame formed of converging side members curved inwardly and upwardly adjacent their front end and extending forward in contact with each other, the ends of said members being connected together by a clevis, face-plates connected to the side members adjacent their inwardly and upwardly projecting portions and spaced from the side members, cultivator-teeth secured between said face-plates and side members by bolts, a cultivator-tooth secured to the forward portion of one of the members and a handle connected to the raised portion of the side members supported by a frame secured between the face-plates and side members, for the purpose set forth.

DAVID A. HELLUMS.

Witnesses:
R. B. PATTERSON,
W. T. HELLUMS.